C. T. HILDEBRANDT.
AUTOMATIC STARTING DEVICE.
APPLICATION FILED SEPT. 23, 1907.
968,561.
Patented Aug. 30, 1910.
5 SHEETS—SHEET 1.
Fig. 1.
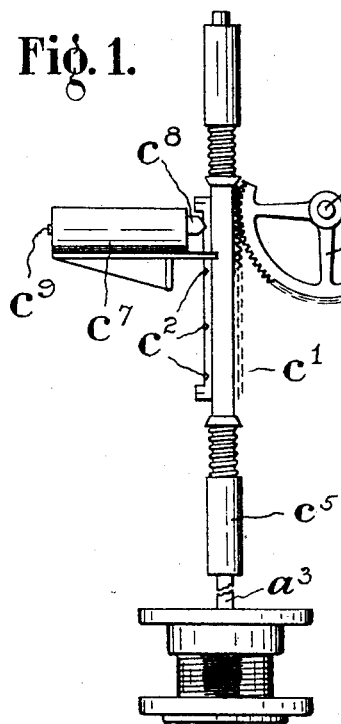
Fig. 9.
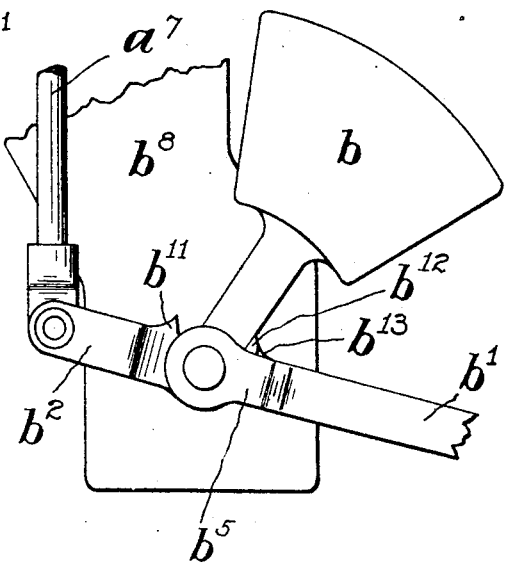
Fig. 8.
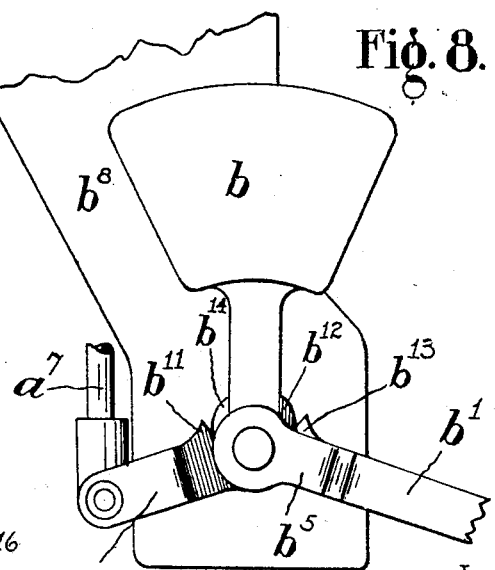
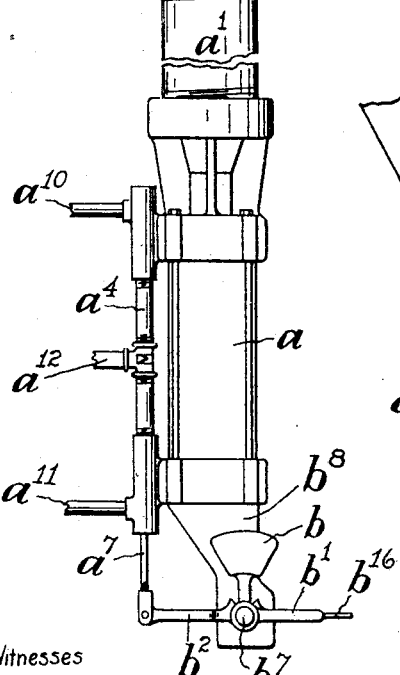
Witnesses
W. H. Christman
Chas. J. Welch
Inventor.
Charles T. Hildebrandt
By Staley & Burman
Attorneys.

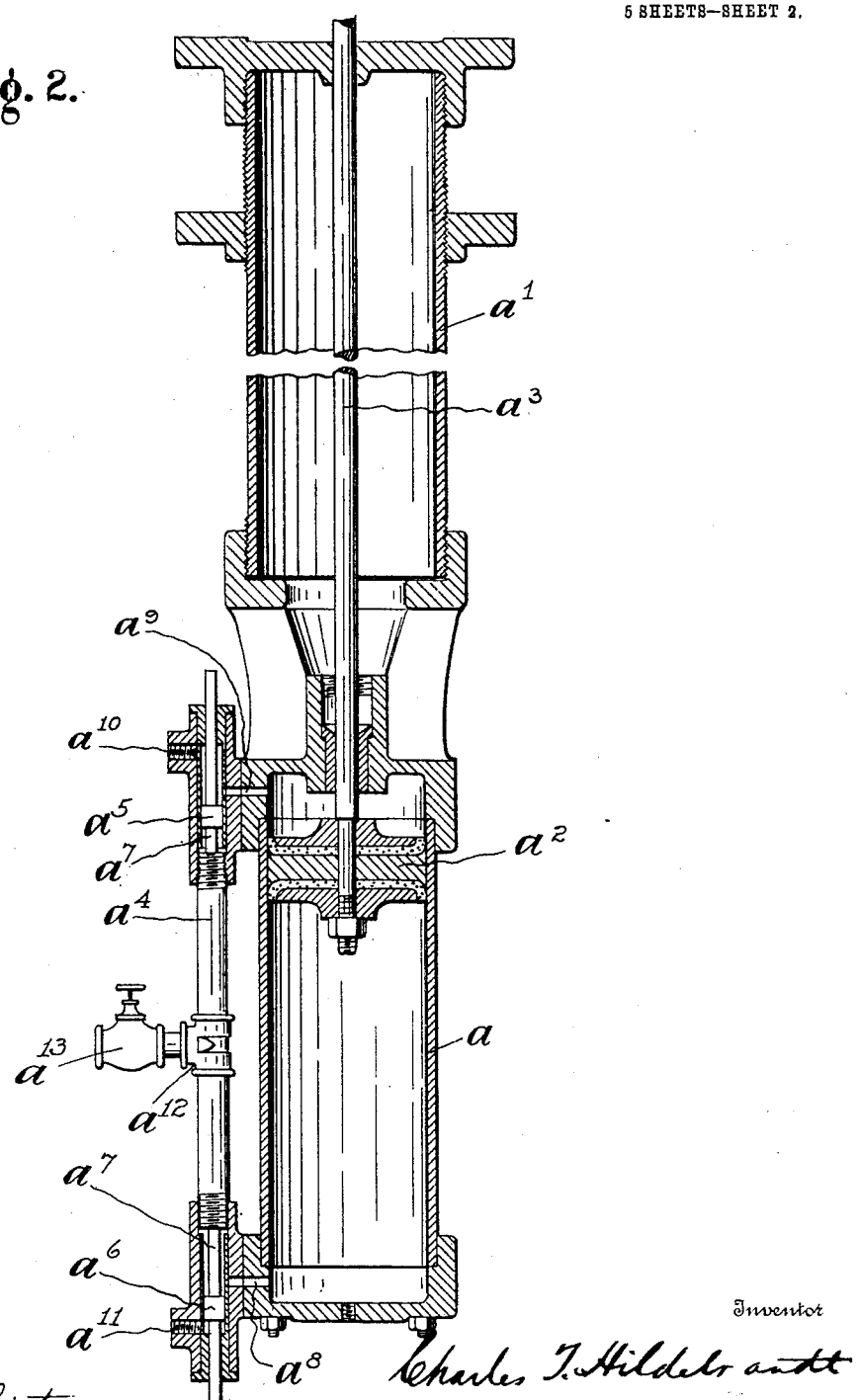

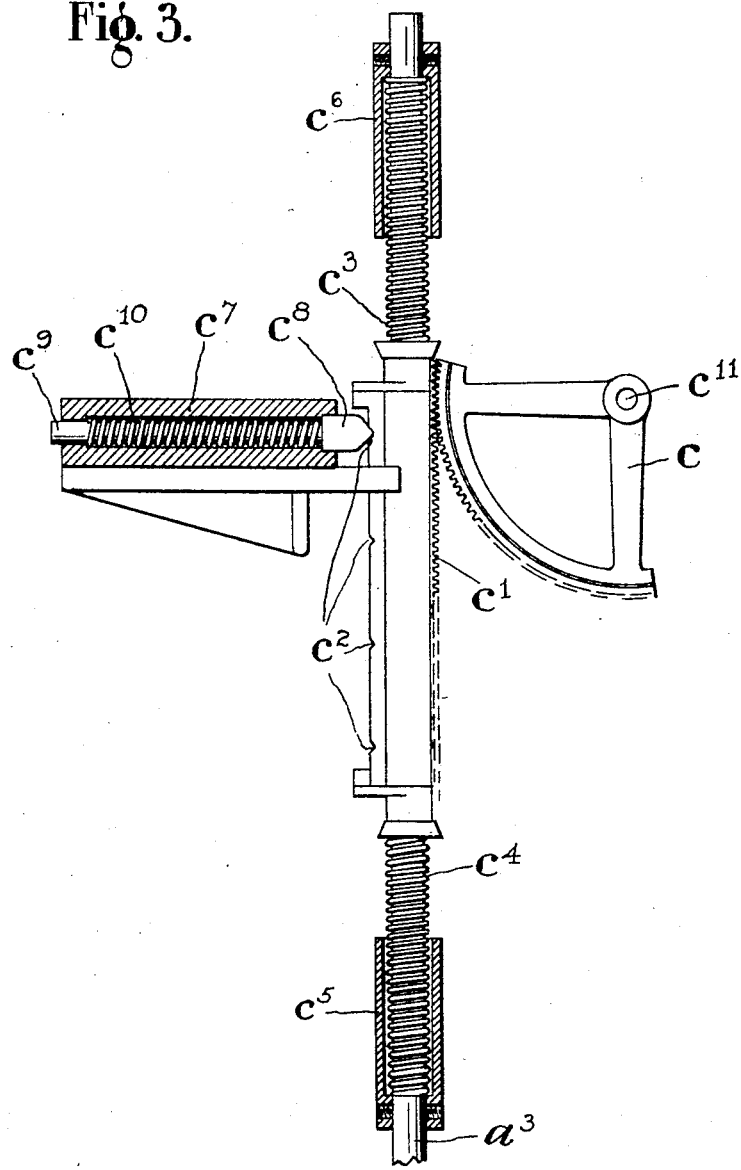

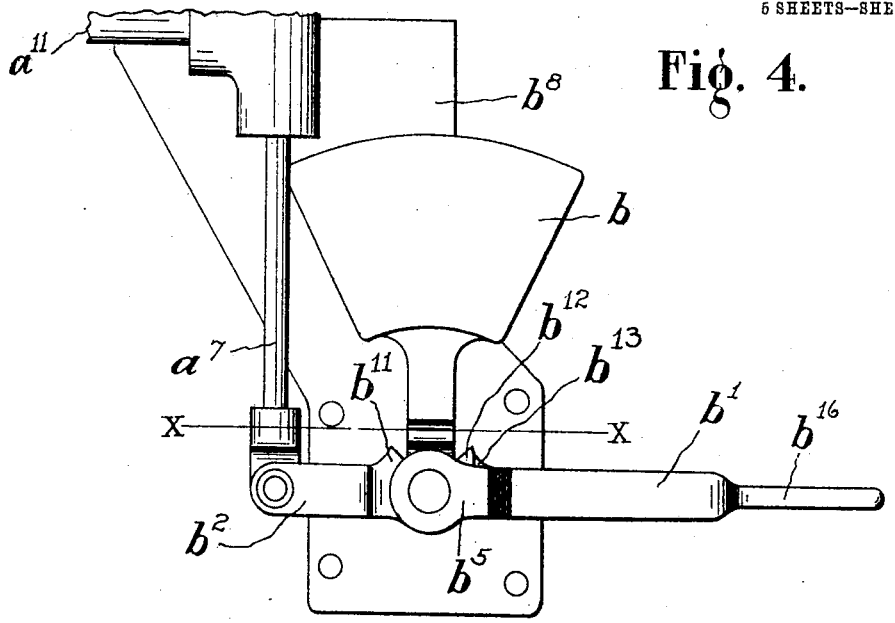
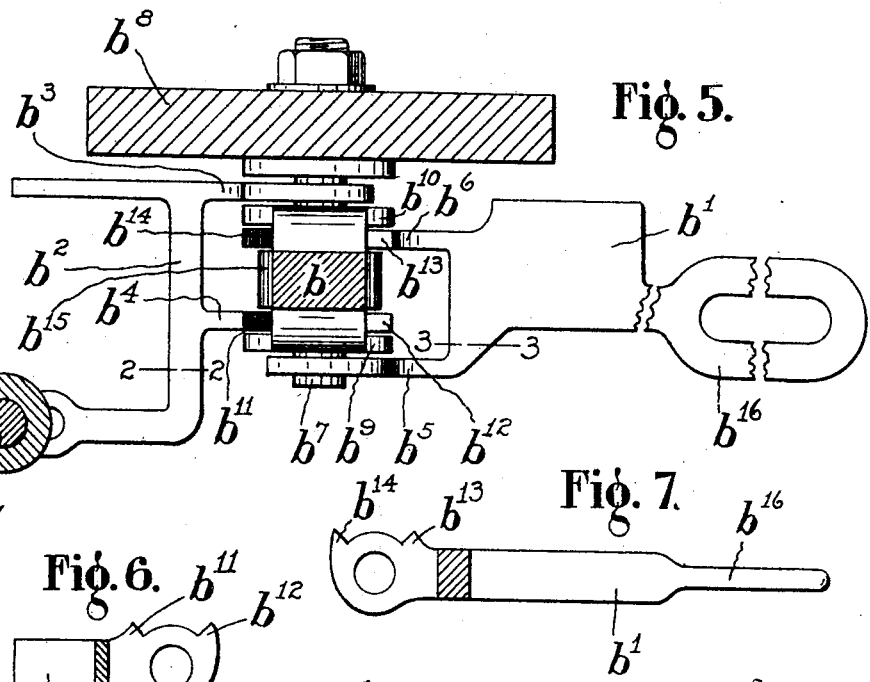

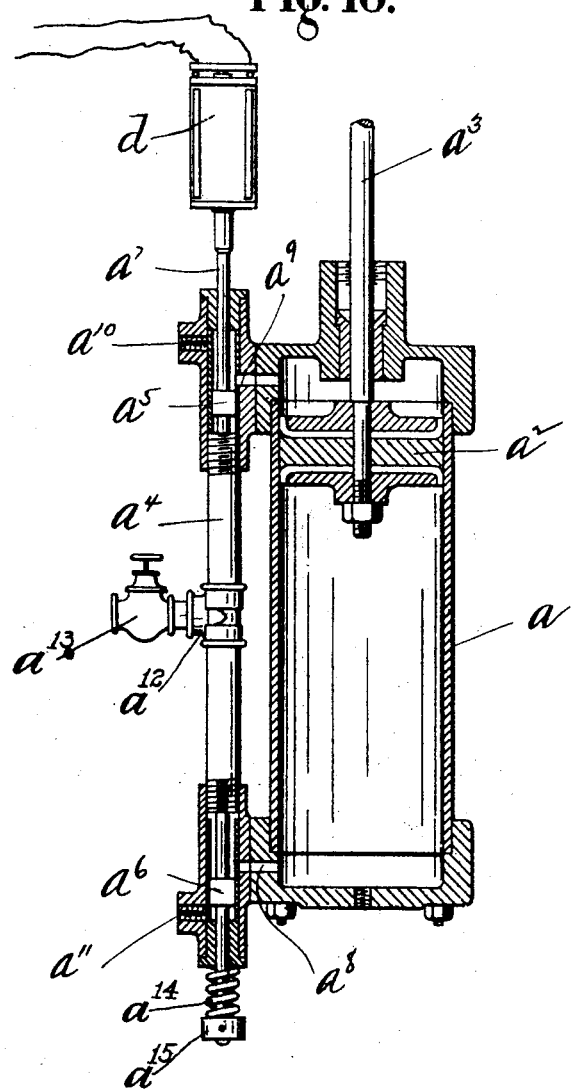

UNITED STATES PATENT OFFICE.

CHARLES T. HILDEBRANDT, OF DAYTON, OHIO, ASSIGNOR TO THE DAYTON HYDRAULIC MACHINERY COMPANY, OF DAYTON, OHIO, A CORPORATION OF OHIO.

AUTOMATIC STARTING DEVICE.

968,561. Specification of Letters Patent. Patented Aug. 30, 1910.

Application filed September 23, 1907. Serial No. 394,009.

*To all whom it may concern:*

Be it known that I, CHARLES T. HILDEBRANDT, a citizen of the United States, residing at Dayton, in the county of Montgomery and State of Ohio, have invented certain new and useful Improvements in Automatic Starting Devices, of which the following is a specification.

This invention relates to improvements in automatic starting devices for electric motors and it particularly relates to a device adapted for use with the ordinary starting boxes such as are furnished by different electric companies, and especially for starting and stopping electrically driven pumps for pumping out tanks and similar purposes when the water reaches different levels or different pressures.

The object of the invention is to simplify the construction of devices of this kind and also provide one which will be more efficient in operation.

The invention consists in the constructions hereinafter described and set forth in the claims.

In the accompanying drawings, Figure 1 is a side view of a device embodying my invention. Fig. 2 is a vertical sectional view of the hydraulic cylinder and its valve mechanism and supports. Fig. 3 is a view showing the devices for communicating the movement of the piston to the starting box, some of the parts being shown in section. Fig. 4 is a side elevation of the mechanism for operating the hydraulic cylinder valves, the parts in this view, however, being shown in an abnormal position. Fig. 5 is a top plan of the same, some of the parts being shown in section, the section being taken on the line $x$ $x$ of Fig. 4, the parts being in the position shown in Fig. 4. Fig. 6 is a detail of the valve-lever and Fig. 7 is a detail of the float lever of the same. Fig. 8 is a side view of the valve operating mechanism, showing the parts in the position which they will assume when the operation weight has been raised to a straight vertical position by the float-lever. Fig. 9 is a similar view showing the position of the parts after the weight has fallen and operated the valve-lever. Fig. 10 is a modification.

Like parts are indicated by similar letters of reference in the several views.

In the said drawings, $a$, represents a hydraulic cylinder, hung by means of a suitable pipe connection, $a^1$, in any convenient place; it may be below the floor line or in a well, below frost line when exposed. A piston, $a^2$, is provided, the rod, $a^3$, of which is connected to the starting box in the manner hereinafter more fully described for the purpose of starting and stopping the motor or other device. In the constructions shown in Figs. 4 to 7, inclusive, are shown devices for operating this piston from a float valve. Located on the outside of the cylinder, $a$, is a chamber, $a^4$, to which leads the water supply, $a^{12}$, and within which are located valves, $a^5$, $a^6$, connected together by a valve rod, $a^7$, the water supply being between the valves and the valves being adapted to alternately open and close the supply ports, $a^8$ $a^9$, on opposite sides of the piston by a longitudinal movement of the valve-rod to permit the water pressure to move the piston in either direction; exhaust ports, $a^{10}$ $a^{11}$, being provided and adapted to be alternately opened by the valves to permit the escape of the water. By having the valves, $a^5$ $a^6$, connected together it will be seen that they will be balanced by the pressure of the water admitted between them so that they may be easily operated. In the construction shown in Figs. 4 to 7 inclusive I have shown means for operating these valves by a float. This consists essentially of a weight, $b$, having a limited movement between two levers, one of which, $b^1$, operates the weight from the float or similar device and the other, $b^2$, of which is operated by the weight and is pivotally connected to the valve stem, $a^7$. Each of the said levers is bifurcated, the arms, $b^3$ $b^4$ $b^5$ and $b^6$, of the bifurcated portions being pivoted upon a stud, $b^7$, secured to a suitable supporting bracket, $b^8$. The lower part of the weight, $b$, is likewise bifurcated, the arms, $b^9$ $b^{10}$, of its bifurcated part being likewise pivoted upon said stud, $b^7$. The arm, $b^4$, of the lever, $b^2$, and the arm, $b^6$, of the lever, $b^1$, are each provided on opposite sides of the bifurcated portions of the weight, $b$, with shoulders, $b^{11}$, $b^{12}$, $b^{13}$ and $b^{14}$, the arrangement of the respective arms upon said stud being such that the arms, $b^4$, and $b^6$, upon which are placed the said shoulders, will come within the bifurcated portion of said weight. A collar, $b^{15}$, is secured to the said stud between the arms, $b^4$ and $b^6$, to retain the respective parts in position on the stud. The float or other device for operating the parts will be attached to the projecting arm, $b^{16}$, of the lever, $b^1$, in any suitable manner. The result of the operation of these devices is that as the float raises the lever, $b^1$, the shoulder, $b^{13}$, will contact the bifurcated portion of the weight and raise the same until it has passed the vertical center of the stud whereupon the weight will drop by gravity and striking the shoulder, $b^{11}$, of the lever, $b^2$, will draw the valve rod, $a^7$, down, so as to operate the valves to permit the water pressure to enter the supply port, $a^8$, and exhaust through port, $a^{10}$, thus forcing the piston to the opposite end of the cylinder. As the float drops by the lowering of the water the shoulder, $b^{14}$, on the said lever, $b^1$, will again raise the weight so that after it has again passed the vertical center it will drop to the opposite side by gravity and contacting the shoulder, $b^{12}$, of the lever, $b^2$, will move the valve stem, $a^7$, upwardly to open the supply port, $a^9$, and exhaust port, $a^{11}$, to permit the water pressure to force the piston to the other end of the cylinder. The speed at which the piston travels in either direction is regulated by the valve or cock $a^{13}$, attached to the water supply, $a^{12}$. By reducing or increasing the flow of water through the valve or cock, $a^{13}$, the speed of the piston can be adjusted to meet existing conditions.

Starting boxes ordinarily require intervals of movement, and should be moved quickly or snapped from one position to the other. To accomplish this I have provided the devices shown in Fig. 3 of the drawings. $c$, is a gear segment connected to the shaft $c^{11}$ of a starting box (not shown) in the same manner as the ordinary crank. $c^1$, is a rack mounted loosely upon the piston rod, $a^3$, this rack being provided with teeth on one side thereof meshing with the gear segment, $c$, and on the opposite side with a series of notches, $c^2$. On opposite sides of this rack about the piston rod are springs, $c^3$ $c^4$, mounted in spring cases, $c^5$ $c^6$, secured to the said piston rod, $a^3$. Suitably supported to one side of the said rack is a casing, $c^7$, having therein a dog, $c^8$, connected to the stem, $c^9$, and a spring $c^{10}$, placed about said stem between the end of the casing and the dog, this dog being adapted to engage the respective notches, $c^2$. When the valves have been operated by the float mechanism and the hydraulic piston starts to move, which in the position of the parts shown in Fig. 3 would be upward, the spring, $c^4$, will be compressed against the rack, $c^1$, until the spring case, $c^5$, strikes the rack, and the continuous movement of the piston rod, $a^3$, moves the rack until the dog, $c^8$, becomes disengaged from the notch, $c^2$, by the compression of the spring, $c^{10}$, whereupon the rack will be moved suddenly the distance of one notch by the expansion of the spring, $c^4$, the dog engaging the second notch. The piston, however, will be traveling continuously and it will immediately again compress the spring, $c^4$, and the operation will be thus repeated until the rack has traveled throughout all the notches and the piston completed its stroke. The same operation exactly will be repeated in the opposite direction. When the movement of the piston is reversed the spring, $c^3$, on the opposite side of the rack will be compressed until the spring case, $c$, strikes the rack, $c^1$, and the further continuous movement of the piston rod, $a^3$, moves the rack until the dog, $c^8$, becomes disengaged from the notch, $c^2$, by the compression of the spring, $c^{10}$, whereupon the expansion of the spring, $c^3$, will move the rack the interval of one notch. This operation will be repeated until the rack has reached its normal position. This operation causes the starting box to be moved at proper intervals through the agency of the rack and the gear segment.

In Fig. 10 is shown a modification in which a solenoid is attached directly to the valve-rod. This solenoid may be operated electrically from an electric pressure switch or from any other electrical appliance so as to govern the valve-rod electrically either by the pressure of the liquid in the tank or from any variable electric voltage. The same arrangement as shown in Fig. 3 for giving the variable movement to the starting box would be employed. Other means for operating the valve-rod might be employed. In Fig. 10 is also shown a spring, $a^{14}$, located about the valve rod between the end of the chamber, $a^4$, and the collar, $a^{15}$, secured to said valve-rod, which spring is used when the apparatus is placed in a horizontal position. When placed in a vertical position the spring is done away with and the weight of the magnet core together with the weight of the valve-rod causes the valve rod to drop to the position shown in Fig. 10 when the current is cut off. This, however, would not occur if the apparatus was placed in a horizontal position and the spring is used to force the valve-rod to the position illustrated in the figure. When the current is turned on the magnet movement of the valve rod will compress the spring as will be readily understood.

Having thus described my invention, I claim:—

1. In a device of the character described, a starting box operating device consisting of a gear segment, a hydraulic cylinder and its piston having valves for admitting water alternately to said cylinder on opposite sides of said piston, a piston rod connected to said piston, a loose rack on said rod in mesh with said gear segment, a spring on said rod, a spring-pressed pawl normally holding said rack from movement, and means on said rod for disengaging said rack from said pawl and for placing said spring under tension to cause said spring to move said rack until again engaged by said pawl, substantially as and for the purpose specified.

2. In a device of the character described, an electric controlling operating device consisting of a gear segment, a hydraulic cylinder and its piston having valves for admitting water alternately to said cylinder on opposite sides of said piston, a piston rod connected to said piston, a loose rack on said rod in mesh with said gear segment, a series of notches in said rack, a spring-pressed pawl adapted to engage with said notches to hold said rack, a spring casing connected to said rod, and a spring in said casing, the movement of said rod being adapted to cause the end of said casing to contact said rack to disengage it from its pawl and to place said spring under tension to cause the same to move said rack when disengaged until said pawl engages the next succeeding notch, substantially as specified.

3. In a device of the character described, a starting box operating device, a hydraulic cylinder and its piston, said piston having an operative connection to said operating device, supply valves for said cylinder, a lever connected to said valves, a weight forming the sole means of operating said valve lever, and an automatically operated lever for operating said weight, substantially as specified.

4. In a device of the character described a starting box operating device, a hydraulic cylinder and its piston, said piston having a connection to said operating device, supply valves for said cylinder, a valve lever connected to said valves at one end and being pivoted on a supporting stud at the other, an automatically operated lever also pivoted on said stud, a pivoted weight on said stud between said levers forming the sole means of operating said valve lever, and engaging parts on said levers for said weight, substantially as and for the purpose specified.

In testimony whereof, I have hereunto set my hand this 16th day of September, 1907.

CHARLES T. HILDEBRANDT.

Witnesses:
ROBERT W. SULLIVAN,
WILLIAM F. CHAMBERLIN.